(12) United States Patent
Mao et al.

(10) Patent No.: US 8,094,833 B2
(45) Date of Patent: Jan. 10, 2012

(54) SOUND SOURCE LOCALIZATION SYSTEM AND SOUND SOURCE LOCALIZATION METHOD

(75) Inventors: Yen-Chieh Mao, Sansia Township, Taipei County (TW); Yu-Liang Chung, Jhudong Township, Hsinchu County (TW); Nai-Chia Chang, Sinying (TW)

(73) Assignee: Industrial Technology Research Institute, Hsinchu (TW)

( * ) Notice: Subject to any disclaimer, the term of this patent is extended or adjusted under 35 U.S.C. 154(b) by 1112 days.

(21) Appl. No.: 11/976,136

(22) Filed: Oct. 22, 2007

(65) Prior Publication Data

US 2008/0247566 A1 Oct. 9, 2008

(30) Foreign Application Priority Data

Apr. 3, 2007 (TW) ................. 96111886 A (51) Int. Cl.
*H04R 3/00* (2006.01)
(52) U.S. Cl. ......................................................... 381/92
(58) Field of Classification Search .................. 381/92
See application file for complete search history.

(56) References Cited

U.S. PATENT DOCUMENTS

| | | |
|---|---|---|
| 4,118,599 A | 10/1978 | Iwahara et al. |
| 4,208,735 A | 6/1980 | Suzuki et al. |
| 4,581,758 A | 4/1986 | Coker et al. |
| 5,060,269 A | 10/1991 | Zinser |
| 5,119,424 A | 6/1992 | Asakawa et al. |
| 5,222,059 A | 6/1993 | Holman |
| 5,365,516 A | 11/1994 | Jandrell |
| 5,465,302 A | 11/1995 | Lazzari et al. |
| 5,602,926 A | 2/1997 | Ohashi et al. |
| 5,778,082 A | 7/1998 | Chu et al. |
| 6,130,949 A | 10/2000 | Aoki et al. |
| 6,469,732 B1 | 10/2002 | Chang et al. |
| 6,593,956 B1 | 7/2003 | Potts et al. |
| 6,600,824 B1 | 7/2003 | Matsuo et al. |
| 6,618,485 B1 | 9/2003 | Matsuo et al. |
| 6,760,449 B1 | 7/2004 | Matsuo et al. |
| 6,774,934 B1 | 8/2004 | Belt et al. |
| 6,999,593 B2 | 2/2006 | Rui et al. |
| 7,039,198 B2 | 5/2006 | Birchfield et al. |
| 7,123,727 B2 * | 10/2006 | Elko et al. ............... 381/92 |
| 7,127,071 B2 | 10/2006 | Rui et al. |
| 2004/0240680 A1 | 12/2004 | Rui et al. |

FOREIGN PATENT DOCUMENTS

| | | |
|---|---|---|
| CN | 1560556 A | 1/2005 |
| CN | 1719277 A | 1/2006 |
| JP | 2000035474 A | 2/2000 |

\* cited by examiner

*Primary Examiner* — Theresa T Doan
(74) *Attorney, Agent, or Firm* — Rabin & Berdo, P.C.

(57) ABSTRACT

A sound source localization system and a sound source localization method. The sound source localization system includes sound capturing devices and an arithmetic unit. The sound capturing devices sense a sound source to output time domain signals. The arithmetic unit transforms the time domain signals into frequency domain signals, performs a cross spectrum process according to the frequency domain signals to determine time differences of arrival, and locates the sound source according to the time differences of arrival and locations of the sound capturing devices.

20 Claims, 6 Drawing Sheets

SOUND SOURCE LOCALIZATION SYSTEM AND SOUND SOURCE LOCALIZATION METHOD

This application claims the benefit of Taiwan application Serial No. 96111886, filed Apr. 3, 2007, the subject matter of which is incorporated herein by reference.

BACKGROUND OF THE INVENTION

1. Field of the Invention

The invention relates in general to an air vibration signal localization system and an air vibration signal localization method thereof, and more particularly to a sound source localization system and a sound source localization method.

2. Description of the Related Art

A conventional method adopts an image localization system to locate a target. The image localization system includes an image acquiring device and an image processing unit. The image acquiring device acquires an image of the target to be located, and thus outputs image data to the image processing unit. The image processing unit calculates the location of the target according to the image data outputted from the image acquiring device.

However, the data quantity of an image signal is significant large, the processing speed of the image processing unit is relative slow. Furthermore, the hardware requirement of the image localization system is high, thereby increasing the manufacturing cost and the power consumption. In addition, the image localization system tends to be restricted by the environmental brightness or the weather condition. For example, when the electrical power is off or the heavy fog is generated, the image localization system cannot locate the target. So, it is an important subject of the invention to provide a different localization system to improve the drawback caused in the conventional image localization system.

SUMMARY OF THE INVENTION

The invention is directed to a sound source localization system and a sound source localization method, in which time domain signals outputted from sound capturing devices, such as microphones, are respectively transformed into frequency domain signals, and then a cross spectrum process is performed according to the frequency domain signals to determine time differences of arrival (TDOA), and the sound source is located according to the time differences of arrival and locations of the sound capturing devices. Consequently, the processing speed of the localization system can be increased, and the hardware requirement of the power consumption of the localization system can be reduced. Furthermore, the sound source localization system is not restricted by the environmental brightness or the weather condition, and can precisely locate the sound source even the electrical power is off or the heavy fog is generated.

According to a first aspect of the present invention, a sound source localization system is provided. The sound source localization system includes sound capturing devices and an arithmetic unit. The sound capturing devices respectively sense a sound source as the time domain signals. The arithmetic unit transforms the time domain signals into frequency domain signals, performs a cross spectrum process according to the frequency domain signals to determine time differences of arrival (TDOA), and locates the sound source according to the time differences of arrival and locations of the sound capturing devices.

According to a second aspect of the present invention, a sound source localization method is provided. The sound source localization method includes the following steps. First, sound capturing devices sense a sound source and output time domain signals correspondingly. Next, the time domain signals are respectively transformed into frequency domain signals. Then, a cross spectrum process is performed according to the frequency domain signals to determine time differences of arrival (TDOA). Finally, the sound source is located according to the time differences of arrival and locations of the sound capturing devices.

The invention will become apparent from the following detailed description of several embodiments. The following description is made with reference to the accompanying drawings.

DETAILED DESCRIPTION OF THE INVENTION

Figure 1:
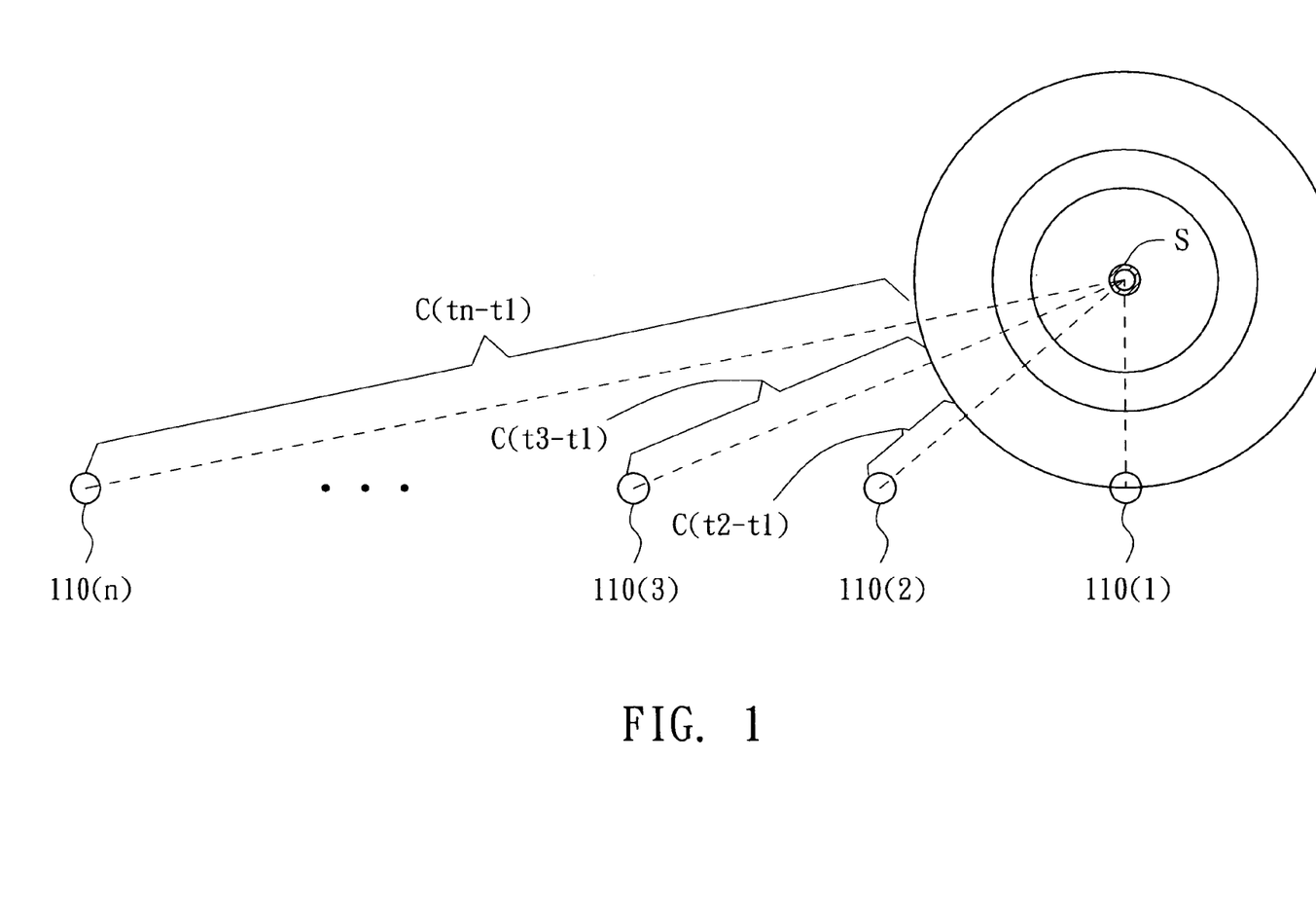
FIG. 1 shows a model of sound capturing devices and a spherical sound field.

FIG. 1 shows a model of sound capturing devices, such as microphones, and a spherical sound field. As shown in FIG. 1, when a sound source S is a point source, it outputs a ball-shaped wave front, which enters sound capturing devices $110(1)$ to $110(n)$ at time $t_1 \sim t_n$, wherein n is a positive integer. A time difference of arrival (TDOA) for the same ball-shaped wave front entering the sound capturing devices $110(2)$ and $110(1)$ is $(t_2-t_1)$, while the TDOA for the same ball-shaped wave front entering the sound capturing devices $110(3)$ and $110(1)$ is $(t_3-t_1)$. Analogically, the TDOA for the same ball-shaped wave front entering the sound capturing devices $110(n)$ and $110(1)$ is $(t_n-t_1)$. When the sound velocity is c, the distance difference between the distance from the sound capturing device $110(2)$ to the sound source S and the distance from the sound capturing device $110(1)$ to the sound source S is $c(t_2-t_1)$, while the distance difference between the distance from the sound capturing device $110(3)$ to the sound source S and the distance from the sound capturing device $110(1)$ to the sound source S is $c(t_3-t_1)$. Analogically, the distance difference between the distance from the sound capturing device $110(n)$ to the sound source S and the distance from the sound capturing device $110(1)$ to the sound source S is $c(t_n-t_1)$.

Figure 2:
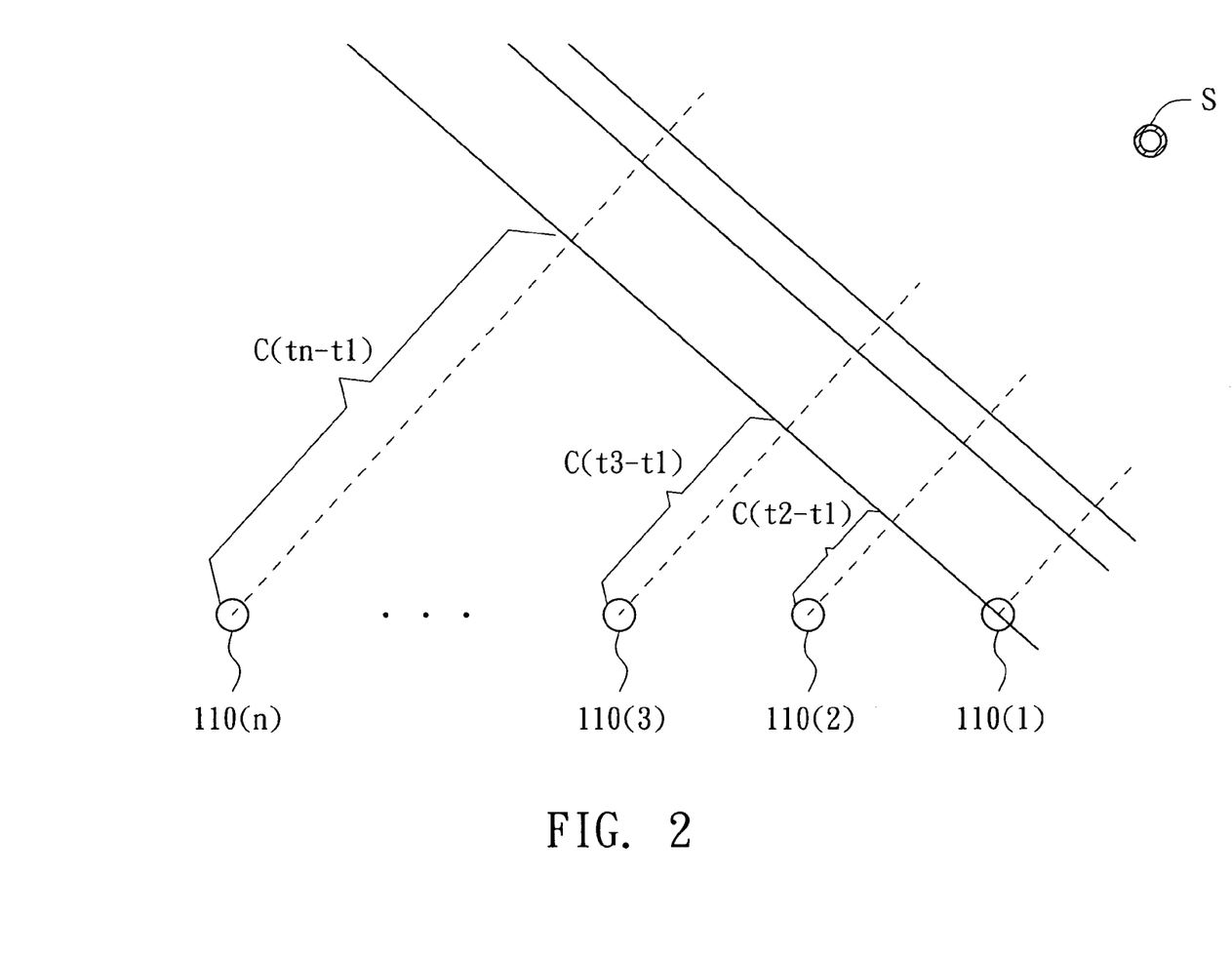
FIG. 2 shows a model of sound capturing devices and a plane sound field.

FIG. 2 shows a model of sound capturing devices and a plane sound field. When the distances from the sound source S to the sound capturing devices $110(1)$ to $110(n)$ are up to infinity, the ball-shaped wave front shown in FIG. 1 may approximate to a plane wave front of FIG. 2, and each plane wave front travels in a direction substantially perpendicular to the travelling direction of the sound wave. When the sound velocity is c, the distance difference between the distance from the sound capturing device $110(2)$ to the sound source S and the distance from the sound capturing device 110(1) to the sound source S is $c(t_2-t_1)$, while the distance difference between the distance from the sound capturing device 110(3) to the sound source S and the distance from the sound capturing device 110(1) to the sound source S is $c(t_3-t_1)$. Analogically, the distance difference between the distance from the sound capturing device 110(n) to the sound source S and the distance from the sound capturing device 110(1) to the sound source S is $c(t_n-t_1)$.

Since the model of the plane sound field is only a special example in which the sound source S in the model of the spherical sound field is located at infinity, the model of the spherical sound field will be described in the following embodiment.

Figure 3:
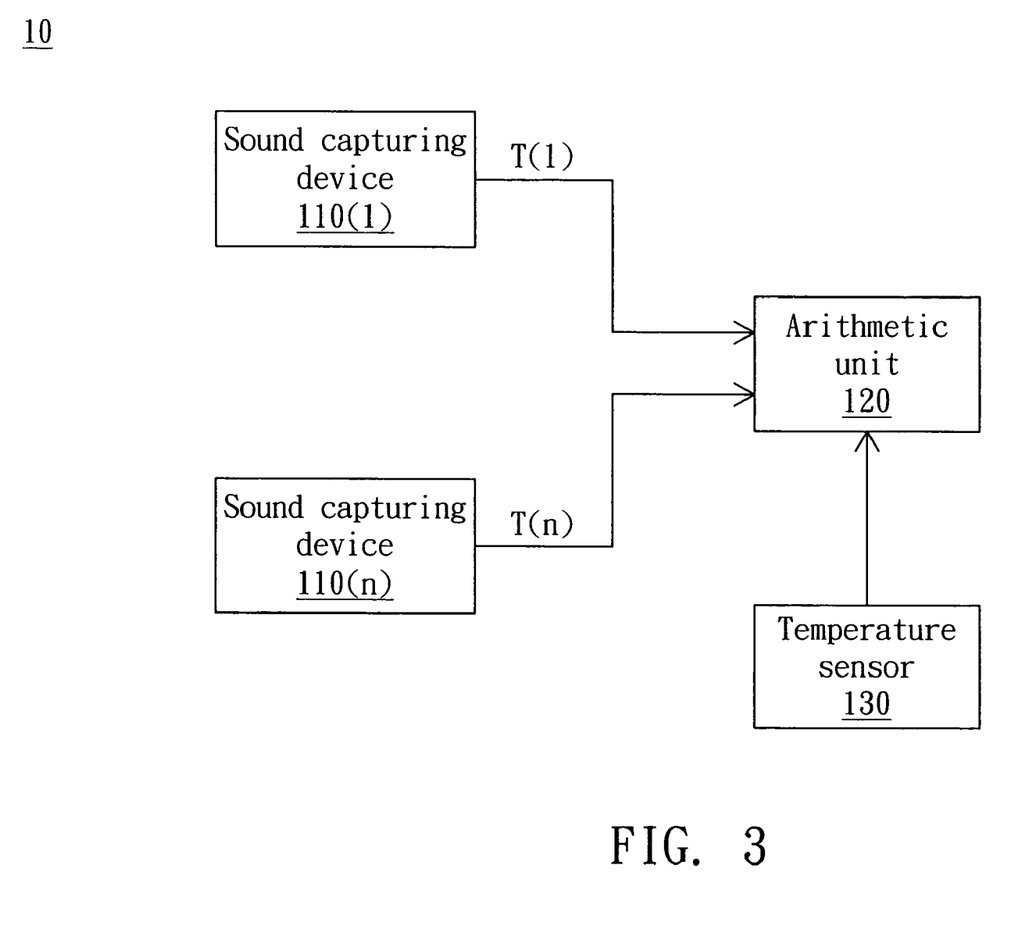
FIG. 3 is a block diagram showing a sound source localization system according to one embodiment of the invention.

FIG. 3 is a block diagram showing a sound source localization system 10 according to one embodiment of the invention. Referring to FIG. 3, the sound source localization system 10 includes sound capturing devices 110(1) to 110(n) and an arithmetic unit 120, wherein n is a positive integer. The sound capturing devices 110(1) to 110(n) sense the sound source S and thus output time domain signals T(1) to T(n).

After receiving the time domain signals T(1) to T(n) outputted from the sound capturing devices 110(1) to 110(n), the arithmetic unit 120 transforms the time domain signals T(1) to T(n) into frequency domain signals by way of fast Fourier transform (FFT), for example.

The arithmetic unit 120 performs a cross spectrum process according to the frequency domain signals T(1) to T(n) to determine time differences of arrival $(t_2-t_1)$ to $(t_n-t_1)$ between the time instants when the wave front of the sound source S enters the sound capturing devices 110(2) to 110(n) and the time instant when the wave front of the sound source S enters the sound capturing device 110(1), and locates the sound source S according to the time differences of arrival $(t_2-t_1)$ to $(t_n-t_1)$, locations of the sound capturing devices 110(1) to 110(n) and the sound velocity c. The sound source localization system 10 may further include a temperature sensor 130 for outputting an environmental temperature to the arithmetic unit 120 so that the arithmetic unit 120 calibrates the sound velocity c according to the environmental temperature.

In detail, after the time domain signals T(1) to T(n) are transformed into the frequency domain signals, the arithmetic unit 120 samples the frequency domain signals in a specific frequency range to get a plurality of sampled frequency domain signals, and calculates phase differences between the sampled frequency domain signals to determine the time differences of arrival $(t_2-t_1)$ to $(t_n-t_1)$ between the time instants when the wave front of the sound source S enters the sound capturing devices 110(2) to 110(n) and the time instant when the wave front of the sound source S enters the sound capturing device 110(1). The specific frequency range may be in a set of predetermined values. Alternatively, the arithmetic unit 120 may find the specific frequency range which covers at least a part of the range of maximum power signals.

For example, the frequency of the human sound typically falls within the frequency band ranging from 200 Hz to 2 K Hz. The specific frequency range can be pre-set as ranging from 200 Hz to 2 K Hz so that the arithmetic unit 120 can analyze the talking sound of the human beings and the interference of the environmental noise can be avoided.

Alternatively, the arithmetic unit 120 finds the specific frequency range which covers the range of maximum power signals. Because the sound source S is typically the sound source with the strongest energy, the arithmetic unit 120 analyzes the specific frequency range corresponding to the maximum power among the frequency domain signals T(1) to T(n) to thus avoid the interference of the environmental noise.

Figure 4:
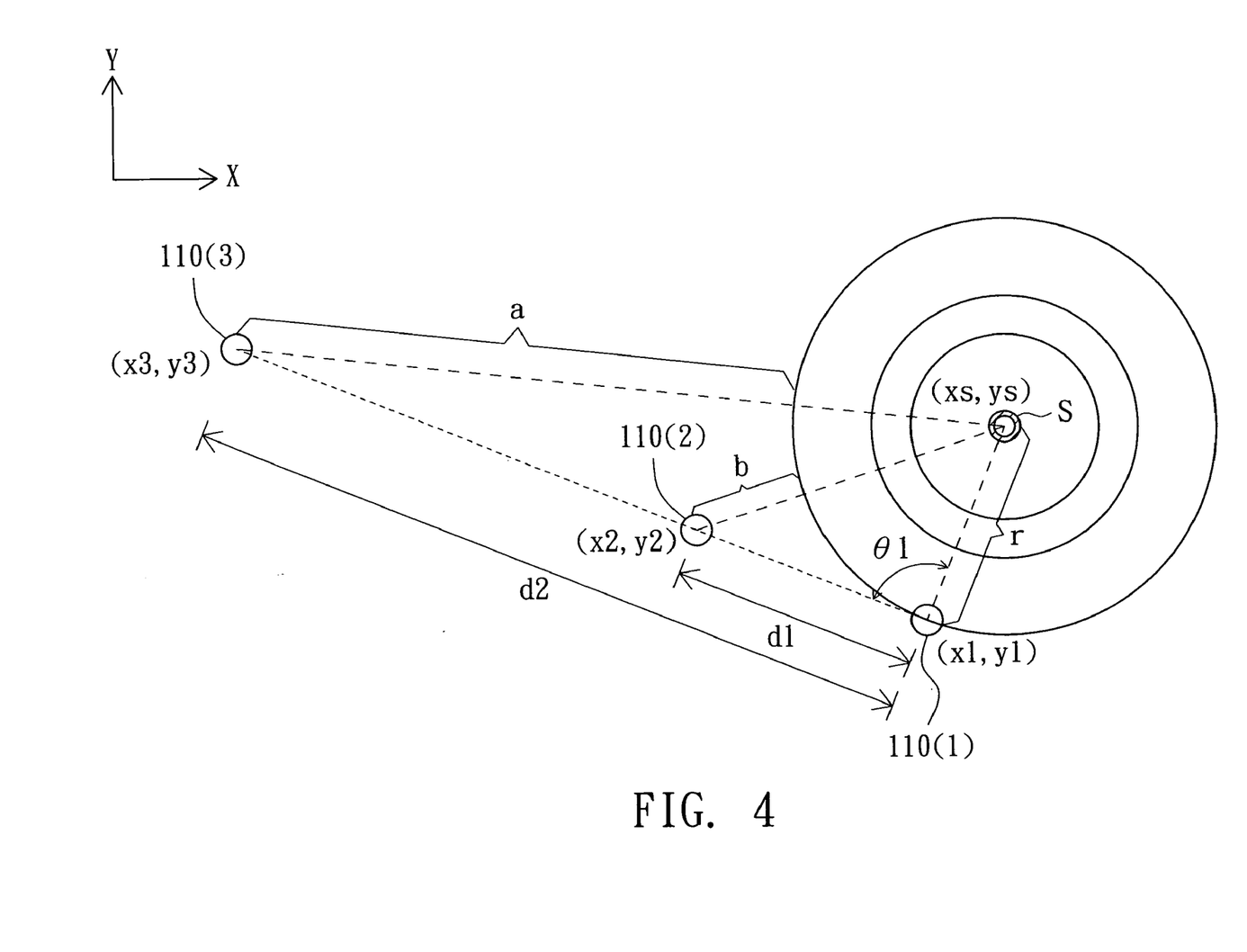
FIG. 4 is a schematic illustration showing sound capturing devices disposed in a two-dimensional plane to sense a sound source.

FIG. 4 is a schematic illustration showing sound capturing devices disposed in a two-dimensional plane to sense a sound source. When the sound source localization system 10 performs the two-dimensional plane localization, at least three sound capturing devices are disposed on the same plane. The arithmetic unit 120 locates the sound source S according to the time differences of arrival, the locations of the sound capturing devices, the sound velocity c and a distance formula.

For example, the coordinates of the sound source S, the sound capturing device 110(1), the sound capturing device 110(2) and the sound capturing device 110(3) are respectively $(x_s,y_s)$, $(x_1,y_1)$, $(x_2,y_2)$ and $(x_3,y_3)$. Substituting the coordinates into the distance formula can get the distances from the sound source S to the sound capturing devices 110(1) to 110(3) are $$\sqrt{(x_s-x_1)^2+(y_s-y_i)^2},$$

$$\sqrt{(x_s-x_2)^2+(y_s-y_2)^2},$$

and $$\sqrt{(x_s-x_3)^2+(y_s-y_3)^2},$$

respectively. The distance difference b between the distance from the sound capturing device 110(2) to the sound source S and the distance from the sound capturing device 110(1) to the sound source S is $$\sqrt{(x_s-x_2)^2+(y_s-y_2)^2}-\sqrt{(x_s-x_1)^2+(y_s-y_1)^2},$$

while the distance difference a between the distance from the sound capturing device 110(3) to the sound source S and the distance from the sound capturing device 110(1) to the sound source S is $$\sqrt{(x_s-x_3)^2+(y_s-y_3)^2}-\sqrt{(x_s-x_1)^2+(y_s-y_i)^2}.$$

Since the distance difference b between the distance from the sound capturing device 110(2) to the sound source S and the distance from the sound capturing device 110(1) to the sound source S is also equal to $c(t_2-t_1)$, and the distance difference a between the distance from the sound capturing device 110(3) to the sound source S and the distance from the sound capturing device 110(1) to the sound source S is also equal to $c(t_3-t_1)$ so that the following simultaneous equations (1) and (2) can be listed:

$$\sqrt{(x_s-x_2)^2+(y_s-y_2)^2}-\sqrt{(x_s-x_1)^2+(y_s-y_1)^2}=c(t_2-t_1), \quad (1)$$

and $$\sqrt{(x_s-x_3)^2+(y_s-y_3)^2}-\sqrt{(x_s-x_1)^2+(y_s-y_1)^2}=c(t_3-t_1). \quad (2)$$

Because the coordinates $(x_1,y_1)$, $(x_2,y_2)$ and $(x_3,y_3)$, the sound velocity c, the TDOA $(t_3-t_1)$ and the TDOA $(t_2-t_1)$ are known, the coordinates $(x_s,y_s)$ can be obtained after the arithmetic unit 120 solves the simultaneous equations (1) and (2). The coordinates $(x_s,y_s)$ represent the location of the sound source S.

In addition, the arithmetic unit 120 may also locate the sound source S according to the time differences of arrival, the locations of the sound capturing devices, the sound velocity c and the trigonometric function.

For example, the trigonometric function is a cosine formula. The distance from the sound source S to the sound capturing device 110(1) is r, the distance d1 from the sound capturing device 110(2) to the sound capturing device 110(1) is $\sqrt{(x_2-x_1)^2+(y_2-y_1)^2}$, and the distance d2 from the sound capturing device 110(3) to the sound capturing device 110(1) is $\sqrt{(x_3-x_1)^2+(y_3-y_1)^2}$.

Substituting the distance r, the distance d1, the distance d2, the distance difference a and the distance difference b into the cosine formula can get the simultaneous equations (3) and (4):

$$\frac{r^2 + d_2^2 - (a+r)^2}{2rd_2} = \cos\theta_1, \quad (3)$$

and $$\frac{r^2 + d_1^2 - (b+r)^2}{2rd_1} = \cos\theta_1. \quad (4)$$

Because the distance d1 is $\sqrt{(x_2-x_1)^2+(y_2-y_1)^2}$, the distance d2 is $\sqrt{(x_3-x_1)^2+(y_3-y_1)^2}$, the distance difference a is equal to $c(t_3-t_1)$ and the distance difference b is equal to $c(t_2-t_1)$, and the distances d1 and d2 and the distance differences a and b are all known, the distance r and $\cos\theta_1$ can be obtained after the arithmetic unit 120 solves the simultaneous equations (3) and (4). The arithmetic unit 120 further takes an arc-cosine operation on the $\cos\theta_1$ to get DOA $\theta_1$, and locates the sound source S according to the distance r and the DOA $\theta_1$.

Figure 5:
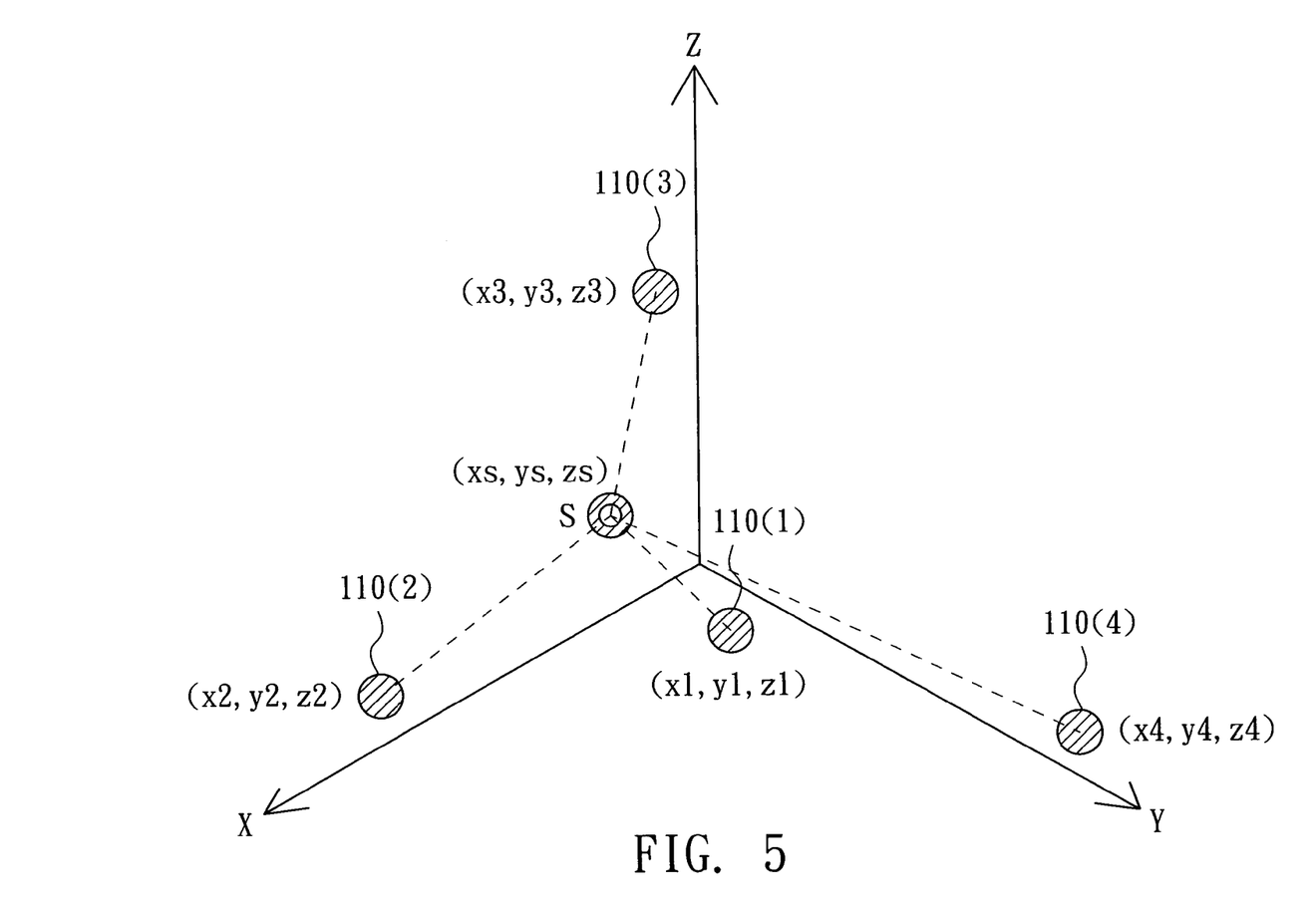
FIG. 5 is a schematic illustration showing sound capturing devices disposed in a three-dimensional space to sense the sound source.

FIG. 5 is a schematic illustration showing sound capturing devices disposed in a three-dimensional space to sense the sound source. As shown in FIG. 5, the sound source localization system 10 can not only perform the two-dimensional plane localization on the sound source S, but also perform the three-dimensional localization on the sound source S. When the sound source localization system 10 performs the three-dimensional localization, at least four sound capturing devices are used, and the four sound capturing devices are not disposed on the same plane. The arithmetic unit 120 locates the sound source S according to the time differences of arrival, the locations of the sound capturing devices, the sound velocity c and the distance formula.

For example, the coordinates of the sound source S and the sound capturing devices 110(1) to 110(4) are respectively $(x_s,y_s,z_s)$, $(x_1,y_1,z_1)$, $(x_2,y_2,z_2)$, $(x_3,y_3,z_3)$ and $(x_4,y_4,z_4)$. Substituting the coordinates into the distance formula can get the distances from the sound source S to the sound capturing devices 110(1) to 110(3), and the distances are respectively $$\sqrt{(x_s-x_1)^2+(y_s-y_1)^2+(z_s-z_1)^2},$$

$$\sqrt{(x_s-x_3)^2+(y_s-y_3)^2+(z_s-z_3)^2}$$

and $$\sqrt{(x_s-x_2)^2+(y_s-y_2)^2+(z_s-z_2)^2}.$$

Consequently, the distance difference between the distance from the sound capturing device 110(2) to the sound source S and the distance from the sound capturing device 110(1) to the sound source S is equal to $$\sqrt{(x_s-x_2)^2+(y_s-y_2)^2+(z_s-z_2)^2} - \sqrt{(x_s-x_1)^2+(y_s-y_1)^2+(z_s-z_1)^2};$$

the distance difference between the distance from the sound capturing device 110(3) to the sound source S and the distance from the sound capturing device 110(1) to the sound source S is equal to $$\sqrt{(x_s-x_3)^2+(y_s-y_3)^2+(z_s-z_3)^2} - \sqrt{(x_s-x_1)^2+(y_s-y_1)^2+(z_s-z_1)^2};$$

and the distance difference between the distance from the sound capturing device 110(4) to the sound source S and the distance from the sound capturing device 110(1) to the sound source S is equal to $$\sqrt{(x_s-x_4)^2+(y_s-y_4)^2+(z_s-z_4)^2} - \sqrt{(x_s-x_1)^2+(y_s-y_1)^2+(z_s-z_1)^2}.$$

The distance difference between the distance from the sound capturing device 110(2) to the sound source S and the distance from the sound capturing device 110(1) to the sound source S is also equal to $c(t_2-t_1)$; the distance difference between the distance from the sound capturing device 110(3) to the sound source S and the distance from the sound capturing device 110(1) to the sound source S is also equal to $c(t_3-t_1)$; and the distance difference between the distance from the sound capturing device 110(4) to the sound source S and the distance from the sound capturing device 110(1) to the sound source S is also equal to $c(t_4-t_1)$. So, the simultaneous equations (1), (2) and (3) may be listed as follows:

$$\sqrt{(x_s-x_2)^2+(y_s-y_2)^2+(z_s-z_2)^2} - \sqrt{(x_s-x_1)^2+(y_s-y_1)^2+(z_s-z_1)^2} = c(t_2-t_1), \quad (1)$$

$$\sqrt{(x_s-x_3)^2+(y_s-y_3)^2+(z_s-z_3)^2} - \sqrt{(x_s-x_1)^2+(y_s-y_1)^2+(z_s-z_1)^2} = c(t_3-t_1), \quad (2)$$

and $$\sqrt{(x_s-x_4)^2+(y_s-y_4)^2+(z_s-z_4)^2} - \sqrt{(x_s-x_1)^2+(y_s-y_1)^2+(z_s-z_1)^2} = c(t_4-t_1). \quad (3)$$

The coordinates $(x_1,y_1)$, $(x_2,y_2)$, $(x_3,y_3)$ and $(x_4,y_4)$, the sound velocity c, the TDOA $(t_2-t_1)$, the TDOA $(t_3-t_1)$ and the TDOA $(t_4-t_1)$ are known. So, the simultaneous equations (1) to (3) can be solved to obtain the coordinates $(x_s,y_s,z_s)$, which represent the location of the sound source S.

Figure 6:
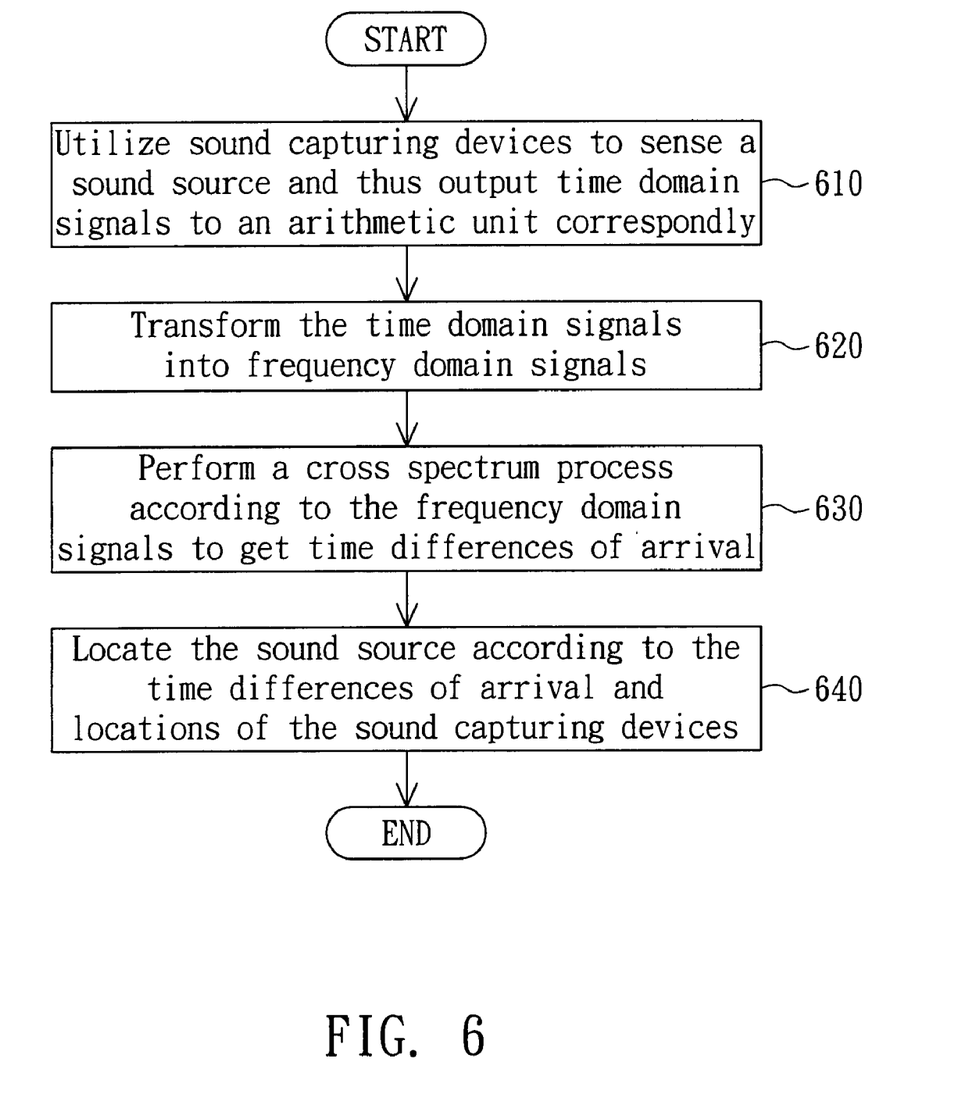
FIG. 6 is a flow chart showing a sound source localization method according to one embodiment of the invention.

FIG. 6 is a flow chart showing a sound source localization method according to one embodiment of the invention. The sound source localization method is applied to the sound source localization system 10, and includes the following steps.

First, as shown in step 610, the sound capturing devices 110(1) to 110(n) are utilized to sense the sound source S, and output the time domain signals T(1) to T(n) to the arithmetic unit 120 correspondingly.

Next, as shown in step 620, the arithmetic unit 120 transforms the time domain signals T(1) to T(n) into the corresponding frequency domain signals. The arithmetic unit 120 transforms the time domain signals T(1) to T(n) into the frequency domain signals by Fourier transform (FT) or fast Fourier transform (FFT), for example.

Then, as shown in step 630, the arithmetic unit 120 performs the cross spectrum process according to the frequency domain signals to determine the time differences of arrival.

Finally, as shown in step 640, the arithmetic unit 120 locates the sound source S according to the time differences of arrival and the locations of the sound capturing devices 110(1) to 110(n).

The sound source localization system and its sound source localization method according to the embodiment of the invention can determine the time differences of arrival ($t_2-t_1$) to ($t_n-t_1$) through the cross spectrum process, and then locate the sound source according to the time differences of arrival and the locations of the sound capturing devices.

In addition, the sound source localization system and its sound source localization method according to the embodiment of the invention include the following features. First, the processing speed of the arithmetic unit is increased and the drawback of the too-slow processing speed of the conventional image localization system can be eliminated because the data quantity of the audio signal is smaller than that of the image signal. Furthermore, the manufacturing cost and the power consumption can be reduced because the hardware requirement of the sound source localization system is lower than that of the conventional image localization system. Moreover, the sound source localization system can precisely locate the sound source even if the electrical power is off or the heavy fog is generated because the sound source localization system is not restricted to the environmental brightness or the weather condition.

While the invention has been described by way of example and in terms of several embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sound source localization system, comprising:
   a plurality of sound capturing devices for sensing a sound source and outputting a plurality of time domain signals correspondingly; and
   a processing unit for transforming the time domain signals into a plurality of frequency domain signals, performing a cross spectrum process according to the frequency domain signals to determine a plurality of time differences of arrival (TDOA), and locating the sound source according to the time differences of arrival and locations of the sound capturing devices.

2. The system according to claim 1, wherein the arithmetic unit respectively samples the frequency domain signals in a specific frequency range to get a plurality of sampled frequency domain signals, and calculates phase differences between the sampled frequency domain signals to determine the time differences of arrival.

3. The system according to claim 2, wherein the specific frequency range is in a set of predetermined values.

4. The system according to claim 2, wherein the specific frequency range covers at least a part of the range of maximum power signals.

5. The system according to claim 1, wherein the arithmetic unit locates the sound source according to the time differences of arrival, the locations of the sound capturing devices and the sound velocity.

6. The system according to claim 1, wherein the arithmetic unit locates the sound source according to the time differences of arrival, the locations of the sound capturing devices, the sound velocity and a distance formula.

7. The system according to claim 1, wherein the arithmetic unit locates the sound source according to the time differences of arrival, the locations of the sound capturing devices, a sound velocity and a trigonometric function.

8. The system according to claim 1, further comprising a temperature sensor for outputting an environmental temperature to the arithmetic unit to calibrate the sound velocity.

9. The system according to claim 1, wherein when the sound source localization system performs a two-dimensional localization, the number of the sound capturing devices is greater than or equal to 3, and the sound capturing devices are disposed on the same plane.

10. The system according to claim 1, wherein when the sound source localization system performs a three-dimensional localization, the number of the sound capturing devices is greater than or equal to 4, and at least four sound capturing devices are not disposed on the same plane.

11. A sound source localization method, comprising the steps of:
    (a) utilizing a plurality of sound capturing devices to sense a sound source and output a plurality of time domain signals correspondingly;
    (b) respectively transforming the time domain signals into a plurality of frequency domain signals;
    (c) performing a cross spectrum process according to the frequency domain signals to determine a plurality of time differences of arrival (TDOA); and
    (d) locating the sound source according to the time differences of arrival and locations of the sound capturing devices.

12. The method according to claim 11, wherein the step (c) comprises:
    (c1) respectively sampling the frequency domain signals in a specific frequency range to get a plurality of sampled frequency domain signals; and
    (c2) calculating phase differences between the sampled frequency domain signals to determine the time differences of arrival.

13. The method according to claim 12, wherein the specific frequency range is in a set of predetermined values.

14. The method according to claim 12, wherein the specific frequency range covers at least a part of the range of maximum power signals.

15. The method according to claim 11, wherein in the step (d), the sound source is located according to the time differences of arrival, the locations of the sound capturing devices and the sound velocity.

16. The method according to claim 11, wherein in the step (d), the sound source is located according to the time differences of arrival, the locations of the sound capturing devices, the sound velocity and a distance formula.

17. The method according to claim 11, wherein in the step (d), the sound source is located according to the time differences of arrival, the locations of the sound capturing devices, a sound velocity and a trigonometric function.

18. The method according to claim 11, further comprising the step of:
  (f) sensing an environmental temperature to calibrate the sound velocity.

19. The method according to claim 11, wherein when a two-dimensional plane localization is performed, the number of the sound capturing devices is greater than or equal to 3, and the sound capturing devices are disposed on the same plane.

20. The method according to claim 11, wherein when a three-dimensional localization is performed, the number of the sound capturing devices is greater than or equal to 4, and at least four sound capturing devices are not disposed on the same plane.

* * * * *